UNITED STATES PATENT OFFICE.

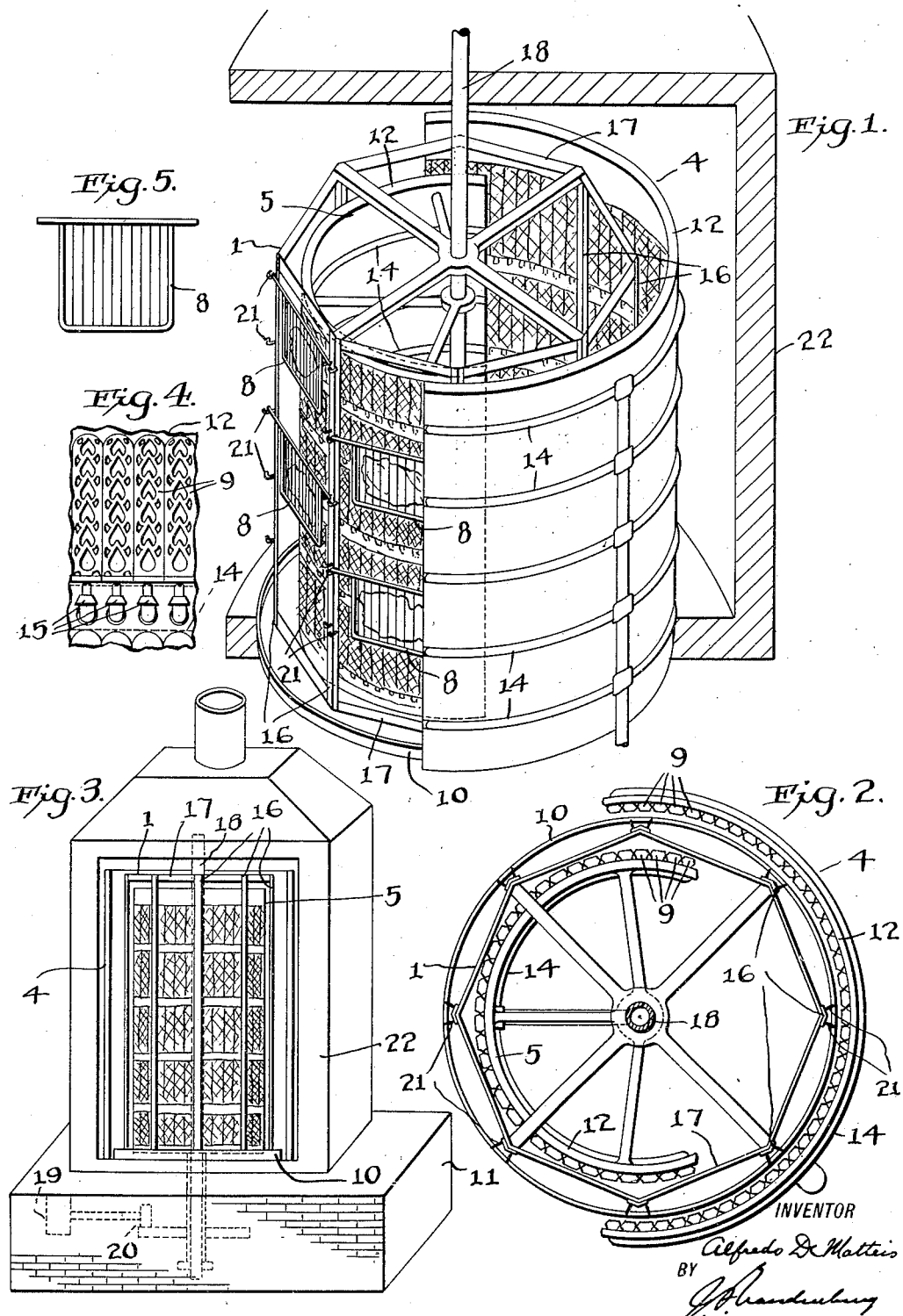

ALFREDO DE MATTEIS, OF NEW YORK, N. Y., ASSIGNOR TO DE MATTEIS BROILER SYSTEM CO., INC., OF NEW YORK, N. Y., A CORPORATION OF NEW YORK.

MEAT-BROILING MACHINE.

1,358,365. Specification of Letters Patent. Patented Nov. 9, 1920.

Application filed January 31, 1919, Serial No. 274,232. Renewed October 6, 1920. Serial No. 415,221.

*To all whom it may concern:*

Be it known that I, ALFREDO DE MATTEIS, a citizen of the United States, residing at New York, in the county of New York and State of New York, have invented a new and useful Meat-Broiling Machine, of which the following is a specification.

The object of the invention is to provide a continuous, copious, clean and easy broiling or like service for restaurants and hotels, and particularly to provide a meat broiler or roaster, useful also as a bread toaster, which shall be economical of space and easily attended, which shall have a large working capacity, and which shall broil and toast in a superior manner and without loss by burning, and which shall be an attraction for the restaurant when installed in public view. The device has a suitable casing open at the front and comprises inner and outer curved luminous radiators, and a hollow prismatic or approximately cylindrical frame for carrying articles to be cooked by direct radiant heat, the frame being arranged to rotate on a central vertical axis between and adjacent the radiators, and the latter being preferably arranged substantially as hereinafter described. In the particular embodiment illustrated flat articles are held by removable grids, which are placed on and taken off the frame as its exposed portion turns in front of the attendant, the articles being cooked upon both sides by passing across the two radiators.

In the accompanying drawings, forming a part hereof:

Figure 1 is a side perspective, with the casing in vertical section;

Fig. 2 is a top plan of the radiators and frame;

Fig. 3 is a front perspective on a smaller scale;

Fig. 4 is an enlarged fragmentary view looking at the face of one of the radiators; and Fig. 5 is a detail of one of the grids.

An outer curved luminous radiator or heater, of larger diameter, is designated 4, and an inner or smaller curved luminous radiator is designated 5. These radiators are stationary and are disposed substantially concentric with relation to a vertical axis. A curved or substantially cylindrical food-carrying frame or cage 1 is supported to rotate about said vertical axis between and adjacent the radiators. Squashed chickens, steaks, fish, etc., carried flatly and vertically upon the rotating frame are thus exposed to the broiling heat at both sides without turning or reversing them. The circuit of the outer radiator is interrupted in front, to afford access to the frame, and the inner heater is shown as also being incompletely circular. In the best embodiment the radiators are reversely disposed, the outer heater being at the back, and the inner at the front, and preferably overlapping each other.

The radiators and frame are inclosed in a suitable casing or housing 22, forming a chamber open at the front. This casing may be constructed of refractory material covered with tiles, and may be set upon a base 11.

The construction of the radiators and the mode of heating them may be varied. In the present preferred embodiment, each comprises a curved wall 12 of refractory material, and a radiant facing formed of skeleton tubular elements 9 of known kind, adapted to be rendered incandescent by gas flames entering their bases. Such elements may be wired on the walls in tiers, and supplied from gas-pipes 14 on the opposite sides of the walls, having multiple outlet branches passing through holes in the walls and terminating in suitable burners 15 arranged to direct their flames upward into the tubular elements. Control valves will be placed where desirable. The larger radiator is of course heated upon its inner side, and the small radiator upon its outer side.

The frame 1 may be simply constructed of vertical rods or flat bars 16 connected at top and bottom with suitable wheel frames 17 turning upon a central axle 18, and is driven from an electric motor 19 or other source of power through suitable gearing indicated at 20. Beneath the bottom of the frame is a drip pan 10. As shown, the frame may be prismatic rather than perfectly cylindrical, and the same could naturally be true of the radiators.

The frame is equipped with a number of small individual grids 8 upon which the articles are placed, these grids being hung upon hooks 21 on the vertical members of the rotating frame, so that they can be readily put on and taken off by the attendant.

From the foregoing the operation will be readily understood. Articles exposed flat upon the vertical side of the frame are carried around between the radiators, that is to say, outside of the inner radiator and inside of the outer one, so that both sides are cooked without necessity for touching them until they are done, when the attendant lifts off the grids carrying such articles as they come in front of him. From the description it will be understood that the food is cooked by direct radiant heat between the radiators, the effect being that of broiling or toasting.

What I claim as new is:

1. In a broiler or toaster, outer and inner curved radiators, and a hollow frame arranged to rotate between said radiators on a central vertical axis, whereby both sides of the material are exposed to the heat.

2. A broiler or toaster, comprising outer and inner curved radiators, and a hollow frame arranged to rotate between and adjacent said radiators on a central vertical axis, the space in which the frame operates being open to the atmosphere.

3. A broiler or toaster, comprising outer and inner curved radiators, a hollow frame arranged to rotate between and adjacent said radiators on a central vertical axis, and means to rotate the frame.

4. In a broiler or toaster, outer and inner curved radiators, and a substantially cylindrical frame arranged to rotate between said radiators on a central vertical axis and provided with means to receive grids upon its sides, whereby both sides of the material are exposed to the heat.

5. In a broiler or toaster, outer and inner incompletely circular radiators arranged reversely with respect to each other, and a hollow frame arranged to rotate between said radiators on a central vertical axis, whereby both sides of the material are exposed to the heat alternately.

6. In a broiler or toaster, the combination of outer and inner curved radiators, a hollow frame arranged to rotate between said radiators on a central vertical axis, and a number of removable grids to be supported vertically on the frame.

7. In a broiler or toaster, outer and inner curved radiators, and a hollow frame arranged to rotate between said radiators on a central vertical axis, the circuit of the outer radiator being interrupted in front.

8. A broiler or toaster comprising a casing having an open front, outer and inner curved radiators in said casing, the circuit of the outer radiator being interrupted in front, and a hollow frame arranged to rotate between said radiators on a central vertical axis.

9. A cooking apparatus of the class described having outer and inner curved radiators, the outer radiator being in rear and having luminous heating means on its inner face, and the inner radiator being in front and having luminous heating means on its outer face, and a hollow frame arranged to rotate between said radiators on a central vertical axis.

10. A cooking apparatus of the class described comprising a casing open at the front, a hollow frame arranged to rotate therein on a central vertical axis, a rear heater in the casing outside the frame to radiate inward, and a front radiator visible inside the frame having its heating means on its outer face.

ALFREDO DE MATTEIS.